United States Patent
Yue et al.

(10) Patent No.: US 9,788,323 B2
(45) Date of Patent: Oct. 10, 2017

(54) FREQUENCY COORDINATION FOR DOWNLINK TRANSMISSIONS

(71) Applicant: Avago Technologies General IP (Singapore) Pte. Ltd., Singapore (SG)

(72) Inventors: Guosen Yue, Edison, NJ (US); Fu-Hsuan Chiu, Berkeley Heights, NJ (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 47 days.

(21) Appl. No.: 14/853,423

(22) Filed: Sep. 14, 2015

(65) Prior Publication Data

US 2016/0234840 A1    Aug. 11, 2016

Related U.S. Application Data

(60) Provisional application No. 62/114,538, filed on Feb. 10, 2015.

(51) Int. Cl.
*H04W 72/04* (2009.01)
*H04W 28/16* (2009.01)
*H04L 5/00* (2006.01)

(52) U.S. Cl.
CPC ......... *H04W 72/0453* (2013.01); *H04L 5/006* (2013.01); *H04L 5/0032* (2013.01); *H04W 28/16* (2013.01); *H04L 5/0073* (2013.01)

(58) Field of Classification Search
CPC ........... H04W 72/0453; H04W 72/042; H04W 72/085; H04W 72/04; H04W 80/04; H04W 88/06
See application file for complete search history.

(56) References Cited

U.S. PATENT DOCUMENTS

| 2010/0105406 A1* | 4/2010 | Luo | H04W 52/241 455/452.2 |
| 2011/0183623 A1* | 7/2011 | Yang | H04B 7/0408 455/63.1 |
| 2012/0122503 A1* | 5/2012 | Ma | H04W 16/10 455/501 |
| 2012/0157155 A1* | 6/2012 | Cho | H04W 52/54 455/522 |
| 2013/0136110 A1* | 5/2013 | Yamamoto | H04W 72/0446 370/336 |
| 2013/0281089 A1* | 10/2013 | Chandrasekhar | H04W 24/02 455/434 |

(Continued)

*Primary Examiner* — Andrew Lee
(74) *Attorney, Agent, or Firm* — Foley & Lardner LLP

(57) ABSTRACT

Methods relating to managing operations of small cells are provided. One method includes receiving, from a management system configured to manage one or more operations of a plurality of small cells, a plurality of fractional frequency reuse (FFR) patterns for a frequency range. Each FFR pattern is configured to define a plurality of cell groupings, each including one or more of the plurality small cells. Each of the plurality of cell groupings is configured to transmit downlink transmissions over a different one of a plurality of frequency bands within the frequency range. The method further includes selecting a first FFR pattern from among the plurality of FFR patterns received from the management system and transmitting downlink transmissions in accordance with the first FFR pattern.

20 Claims, 17 Drawing Sheets

(56) References Cited

U.S. PATENT DOCUMENTS

| | | | |
|---|---|---|---|
| 2014/0031049 A1* | 1/2014 | Sundaresan | H04W 16/02 455/447 |
| 2014/0269632 A1* | 9/2014 | Blankenship | H04W 76/025 370/336 |
| 2015/0029908 A1* | 1/2015 | Sundaresan | H04W 16/10 370/278 |
| 2015/0133129 A1* | 5/2015 | Chiang | H04W 16/10 455/447 |
| 2015/0373712 A1* | 12/2015 | Lee | H04W 72/0453 370/329 |
| 2016/0135175 A1* | 5/2016 | Tarlazzi | H04W 28/08 370/329 |
| 2016/0352394 A1* | 12/2016 | Boudreau | H04W 72/1215 |

\* cited by examiner

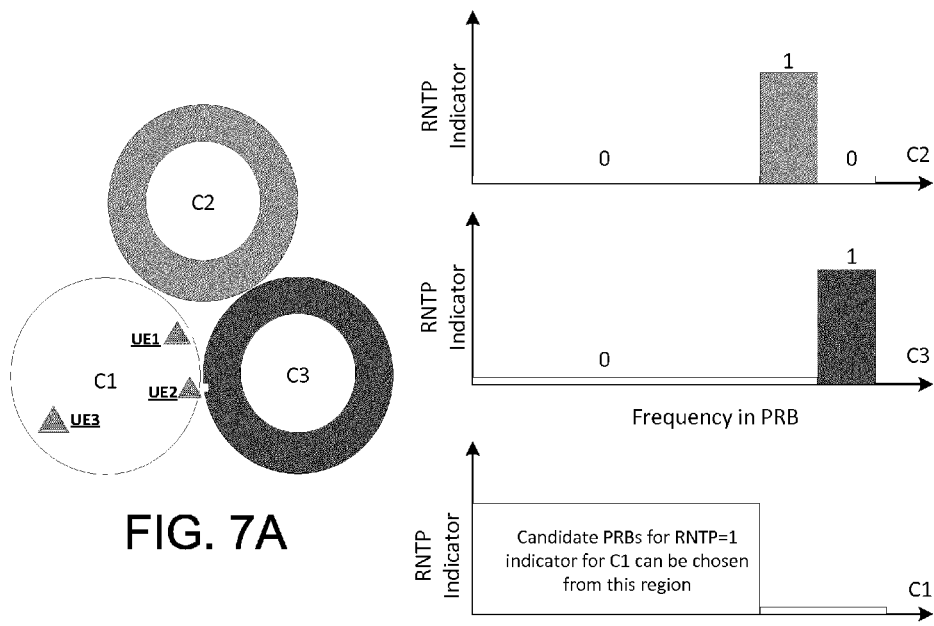

FIG. 7A

| IE/Group Name | Presence | Range | IE type and reference | Semantics description | Criticality | Assigned Criticality |
|---|---|---|---|---|---|---|
| RNTP Per PRB | M | | BIT STRING (6..110, ...) | Each position in the bitmap represents a $n_{PRB}$ value (i.e. first bit=PRB 0 and so on), for which the bit value represents $RNTP(n_{PRB})$, defined in TS 36.213 [11]. Value 0 indicates "Tx not exceeding RNTP threshold". Value 1 indicates "no promise on the Tx power is given" | – | – |
| RNTP Threshold | M | | ENUMERATE D(-∞,-11,-10,-9,-8,-7,-6,-5,-4,-3,-2,-1,0,1,2,3,...) | $RNTP_{threshold}$ is defined in TS 36.213 [11] | – | – |
| Number Of Cell-specific Antenna Ports | M | | ENUMERATE D (1, 2, 4, ...) | $P$ (number of antenna ports for cell-specific reference signals) defined in TS 36.211 [10] | – | – |
| P_B | M | | INTEGER (0..3, ...) | $P_B$ is defined in TS 36.213 [11] | – | – |
| PDCCH Interference Impact | M | | INTEGER (0..4, ...) | Measured by Predicted Number Of Occupied PDCCH OFDM Symbols (see TS 36.211 [10]). Value 0 means "no prediction is available" | – | – |

FIG. 7B

| Name | Type | Scope | Description |
|---|---|---|---|
| REM parameter, LTE co-channel [0..15] | | | |
| RSRP | UINT8 | 0..128 | Represents from -144..-16 in dBm, in 1dB step |
| UE report [0..15] | | | |
| Strongest RSRP from neighbor | UINT8 | 0..104 | Represents from -144..-40 in dBm, in 1dB step |
| RSRP from HeNB | UINT8 | 0..104 | Represents from -144..-40 in dBm, in 1dB step |
| RSRQ | UINT8 | 0..34 | Represent from -19.5 to -3 in dB, in 0.5dB step |
| WB-CQI report | UINT8 | 0..15 | CQI value |
| Sub-band CQI report | UINT8 vector | 0..15 | CQI report, max dimension is 13 |
| Proprietary/SCF SON API | | | |
| IMDLProtectedPRB | Binary matrix | 110 by 6 max | 6-row by N_PRB column (max 110) matrix with binary entry, N_PRB is the PRB in the HeNB bandwidth. Each column is a RNTP vector. First vector(left-most in the matrix) is the one to be used by this HeNB. Index from top down represent increasing PRB index |
| IMFairnessLevel | Enum | Low, medium, high | Fairness level setting by using IM |
| IMFreqHardFFR | Binary | True, False | Is true then hard frequency reuse is used, otherwise, soft frequency reuse is used |
| IMFreqEnable | Binary | True, False | Enable frequency domain IM |
| Proprietary | | | |
| PCI to Protected PRB vector mapping | LUT | Max 6 PCI values | This table established a mapping between PCI and RNTP mask, so that a HeNB can do its mapping while also knowing what pattern its neighbors are using based on their PCI choices |
| IM enable threshold | UINT8 | 0..128 | Represents from -144..-16 in dBm, in 1dB step, it is used to check whether all cells are so weak, then no need to use ICIC |

FIG. 11B

| Name | Type | Scope | Description |
|---|---|---|---|
| Cell edge UE index | Binary vector of 16 | True, False | Indicate whether a UE is considered cell edge user |
| PRB p-a setting | Vector of Enum | p-a, p-a-low, p-a-high | Specified per PRB, used to calculate PDSCH power |
| PRB p-b | UINT8 | 0...3 | Used to calculate PDSCH power, pass through parameter |
| P-a | Enum | dB-6, dB-4dot77, dB-3, dB-1dot77, dB0, dB1, dB2, dB3 | Used to calculate PDSCH power for reuse 1 region, , pass through parameter |
| P-a-low | Enum | dB-inf, dB-6, dB-4dot77, dB-3, dB-1dot77, dB0, dB1, dB2, dB3 | Used to calculate PDSCH power for low power in the FFR region, proprietary parameter, pass through parameter |
| P-a-high | Enum | Same as p-a | Used to calculate PDSCH power for high power in the FFR region, proprietary/SCF SON API parameter, pass through parameter |

FIG. 11C

| Name | Type | Scope | Description |
|---|---|---|---|
| REM parameter, LTE co-channel [0..15] | | | |
| RSRP | UINT8 | 0..128 | Represents from -144..-16 in dBm, in 1dB step |
| UE report [0..15] | | | |
| Strongest RSRP from neighbor | UINT8 | 0..104 | Represents from -144..-40 in dBm, in 1dB step |
| RSRP from HeNB | UINT8 | 0..104 | Represents from -144..-40 in dBm, in 1dB step |
| RSRQ | UINT8 | 0..34 | Represent from -19.5 to -3 in dB, in 0.5dB step |
| WB CQI report | UINT8 | 0..15 | CQI value |
| Sub-band CQI report | UINT8 vector | 0..15 | CQI report, max dimension is 13 |
| Proprietary/SCF SON API | | | |
| IMFairnessLevel | Enum | Low, medium, high | Fairness level setting by using IM |
| IMFreqHardFFR | Binary | True, False | Is true then hard frequency reuse is used, otherwise, soft frequency reuse is used |
| IMFreqEnable | Binary | True, False | Enable frequency domain IM |
| Proprietary | | | |
| IM enable threshold | UINT8 | 0..128 | Represents from -144..-16 in dBm, in 1dB step; it is used to check whether all cells are so weak, then no need to use ICIC |

FIG. 12B

| Name | Type | Scope | Description |
|---|---|---|---|
| Cell edge UE index | Binary vector of 16 | True, False | Indicate whether a UE is considered cell edge user |
| PRB p-a setting | Vector of Enum | p-a, p-a-low, p-a-high | Specified per PRB, used to calculate PDSCH power |
| PRB p-b | UINT8 | 0..3 | Used to calculate PDSCH power, pass through parameter |
| P-a | Enum | dB-6, dB-4dot77, dB-3, dB-1dot77, dB0, dB1, dB2, dB3 | Used to calculate PDSCH power for reuse 1 region, pass through parameter |
| P-a-low | Enum | dB-inf, dB-6, dB-4dot77, dB-3, dB-1dot77, dB0, dB1, dB2, dB3 | Used to calculate PDSCH power for low power in the FFR region, proprietary parameter, pass through parameter |
| P-a-high | Enum | Same as p-a | Used to calculate PDSCH power for high power in the FFR region, proprietary/SCF SON API parameter, pass through parameter |

FIG. 12C

| Name | Type | Scope | Description |
|---|---|---|---|
| | | | REM parameter, LTE co-channel [0..15] |
| RSRP | UINT8 | 0..128 | Represents from -144..-16 in dBm, in 1dB step |
| | | | X2 interface input from other cells [0..15] |
| RNTP bitmap | Binary vector | 0, 1 | Max size 110, RNTP indicator |
| RNTP Threshold | Enum | -inf, -11..3 | dB, in 1 dB step except the -inf |
| Number of CS antenna ports | Enum | 1, 2, 3, 4 | Number of antenna ports for CS RS |
| P-b | UINT8 | 0..3 | Cell specific Pb |
| PDCCH interference impact | UINT8 | 0..3 | 1~3 indicate number of PDCCH symbols per TTI, 0 means no prediction |
| | | | UE report [0..15] |
| Strongest RSRP from neighbor | UINT8 | 0..104 | Represents from -144..-40 in dBm, in 1dB step |
| RSRP from HeNB | UINT8 | 0..104 | Represents from -144..-40 in dBm, in 1dB step |
| RSRQ | UINT8 | 0..34 | Represent from -19.5 to -3 in dB, in 0.5dB step |
| WB CQI report | UINT8 | 0..15 | CQI value |
| | | | Proprietary/SCF SON API |
| IMFairnessLevel | Enum | Low, medium, high | Fairness level setting by using IM |
| IMFreqHardFFR | Binary | True, False | Is true then hard frequency reuse is used, otherwise, soft frequency reuse is used |
| IMFreqEnable | Binary | True, False | Enable frequency domain IM |
| | | | Proprietary |
| IM enable threshold | UINT8 | 0..128 | Represents from -144..-16 in dBm, in 1dB step. it is used to check whether all cells are so weak, then no need to use ICIC |

FIG. 13B

| Name | Type | Scope | Description |
|---|---|---|---|
| To scheduler | | | |
| Cell edge UE index | Binary vector of 16 | True, False | Indicate whether a UE is considered cell edge user |
| PRB p-a setting | Vector of Enum | p-a, p-a-low, p-a-high | Specified per PRB, used to calculate PDSCH power |
| PRB p-b | UINT8 | 0..3 | Used to calculate PDSCH power, pass through parameter |
| P-a | Enum | dB-6, dB-4dot77, dB-3, dB-1dot77, dB0, dB1, dB2, dB3 | Used to calculate PDSCH power for reuse 1 region, , pass through parameter |
| P-a-high | Enum | Same as p-a | Used to calculate PDSCH power for cell edge UE, proprietary/SCF SON API parameter, pass through parameter |
| X2 interface to other cells | | | |
| RNTP bitmap | Binary vector | 0, 1 | Max size 110, RNTP indicator |
| RNTP Threshold | Enum | -inf, -11..3 | dB, in 1 dB step except the -inf |
| Number of CS antenna ports | Enum | 1,2,3,4 | Number of antenna ports for CS RS, need to come from other blocks than IM |
| P-b | UINT8 | 0..3 | Cell specific Pb |
| PDCCH interference impact | UINT8 | 0..3 | 1~3 indicate number of PDCCH symbols per TTI. 0 means no prediction. Need to come from other blocks than IM |

FIG. 13C

| Name | Type | Scope | Description |
|---|---|---|---|
| | | | UE report [0..15] |
| RSRP from neighbor cells [0..15] | UINT8 | 0..104 | Represents from -144..-40 in dBm, in 1dB step |

FIG. 14B

FREQUENCY COORDINATION FOR DOWNLINK TRANSMISSIONS

CROSS-REFERENCES TO RELATED APPLICATIONS

This application claims the benefit of and priority to U.S. Provisional Application No. 62/114,538, filed Feb. 10, 2015, which is hereby incorporated by reference herein in its entirety.

FIELD

The present disclosure relates generally to the field of networking, including, but not limited to, the use of small cells in a networked environment.

BACKGROUND

A networked environment generally includes a number of devices. The networked environment can include one or more user devices communicating with a small cell. The small cell facilitates communication between the small cell and the one or more user devices. The small cell can share the networked environment with one or more other small cells, femto-cells, and/or macro-cells. In some embodiments, for example, the small cell can be or include a device that provides network coverage (e.g., wireless coverage) through at least a portion of a residence or other type of building.

BRIEF DESCRIPTION OF THE DRAWINGS

The disclosure will become more fully understood from the following detailed description, taken in conjunction with the accompanying figures, wherein like reference numerals refer to like elements, in which:

FIGS. 7A-B illustrate coordinated interference management between a small cell and neighboring cells according to an embodiment.

FIGS. 11A-C illustrate a block diagram and input and output parameters associated with the activities of the flow of FIG. 8 according to an embodiment.

FIGS. 12A-C illustrate a block diagram and input and output parameters associated with the activities of the flow of FIG. 9 according to an embodiment.

FIGS. 13A-C illustrate a block diagram and input and output parameters associated with the activities of the flow of FIG. 10 according to an embodiment.

FIGS. 14A-B illustrate a block diagram and input and output parameters associated with the activities of the flow of FIG. 10, with the addition of a user device report for determining a frequency band, according to an embodiment.

DETAILED DESCRIPTION

Before turning to the figures, which illustrate the example embodiments in detail, it should be understood that the application is not limited to the details or methodology set forth in the description or illustrated in the figures. It should also be understood that the terminology is for the purpose of description only and should not be regarded as limiting.

Referring generally to the figures, various systems and methods for managing interference coordination between small cells in a networked environment are shown and described. Frequency domain inter-cell interference coordination (ICIC) techniques are described that coordinate frequency usage for cell edge users between neighbor cells in a network. Coordination improves cell edge throughput, particularly for dense small cell deployments in which inter-cell interference significantly impacts network performance in some embodiments. In some embodiments, the frequency domain ICIC as described in the present disclosure improves cell-edge performance and fairness, as cells account for the presence of neighbor cells in the network in some embodiments.

Figure 1:
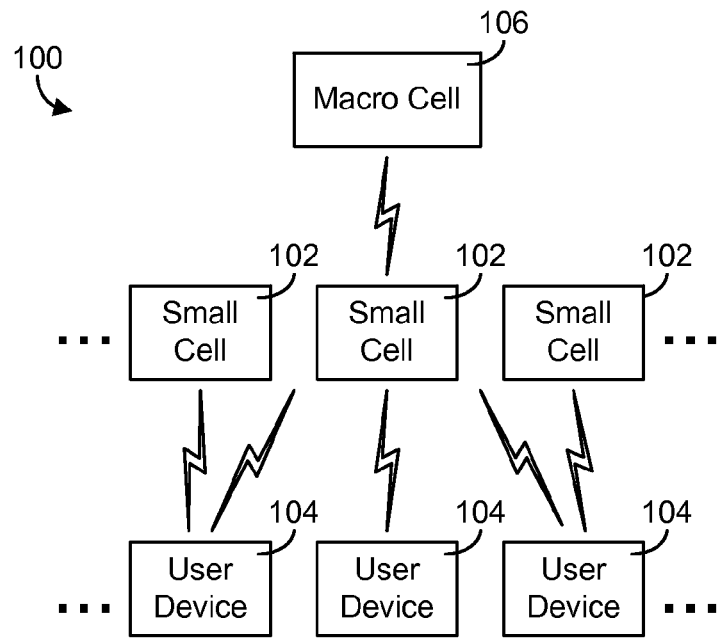
FIG. 1 is a block diagram of a networked environment including nodes and user devices according to an embodiment.

Referring to FIG. 1, a block diagram of a networked environment 100 is shown. Environment 100 generally includes several small cells 102 and user devices 104 connecting to one or more of the small cells. A small cell 102 generally provides wireless access to user devices 104 over a relatively short range. In the network configuration of FIG. 1, multiple small cells 102 are used to provide wireless access to user devices 104 over a larger range. In some embodiments, environment 100 further includes a macro base station or macro cell 106 in communication with small cells 102. Macro cell 106 generally provides wireless access to a larger area, and provides the access to many small cells 102 in the embodiment of FIG. 1 according to some embodiments.

Small cell 102 is implementable in an environment such as an office, commercial or residential building, school, or any other type of environment in which devices connect wirelessly. Small cell 102 communicates with the various devices over a network that incorporates one or more of a variety of communication methods or protocols. Small cell 102 serves as an access point for the various devices, and can be any type of access point for facilitating any type of wireless communication method or protocol.

Small cells 102 can interfere with one another. In some embodiments, there is interference between multiple small cells 102 in environment 100 (e.g., two of the nodes interfering with one another by broadcasting signals on the same or an adjacent channel). Referring to some embodiments in the present disclosure, systems and methods are provided for coordinating the frequency usage of small cells 102 for downlink transmissions (e.g., transmissions from the small cell to one or more user equipment or other downlink devices), improving the quality of signals and improving fairness in the network (e.g., that each small cell and device can communicate with one another in the network).

In some embodiments, the network is a self-organizing network (SON) or other such network that is implemented through the use of many small cells in an area. In other embodiments, the systems and methods herein are implemented for any other type of network including multiple (e.g., many) small cells in an area.

In the present disclosure, the terms "user equipment," "user device," "UE" and the like can be used interchangeably to describe a user device (e.g., a mobile device) receiving and transmitting signals in the networked environment. Further, "small cell," node, "home eNodeB" or "HeNB," and "base station" or "BS" can be used interchangeably, in various embodiments, to describe a single small cell in the networked environment.

Figure 2:
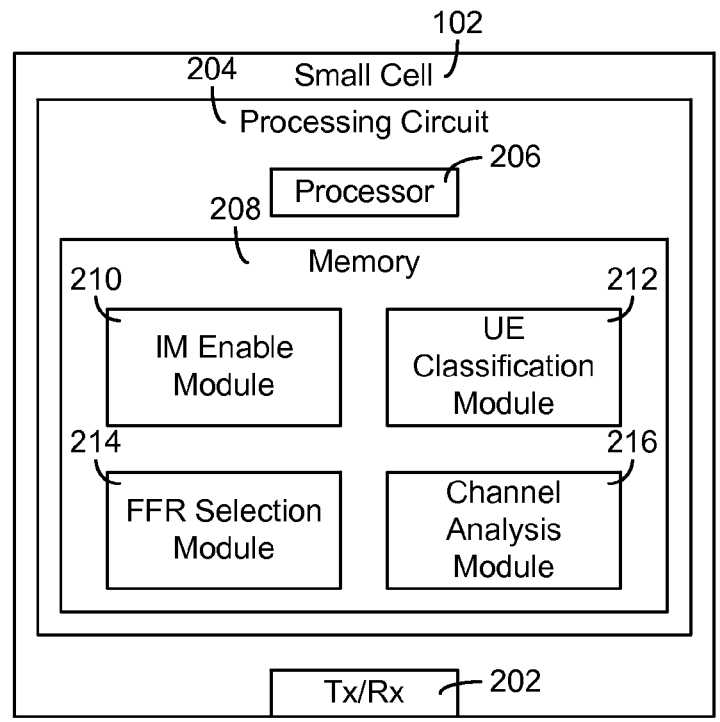
FIG. 2 is a detailed block diagram of a small cell of the networked environment according to an embodiment.

Referring now to FIG. 2, a block diagram of a small cell 102 is shown, according to an exemplary embodiment. In some embodiments, small cell 102 is wirelessly connected to a home (e)nodeB management system (HeMS), shown in FIG. 5. The HeMS is provided as an example system that provides interference management assistance for the small cell in the network. In some embodiments, the HeMS is integrated within another small cell of the network, within a macro cell of the network, or in another device connected to the network. In some embodiments, the interference management of small cell 102 occurs without the assistance of a HeMS. The activities of the HeMS can be implemented in any way without departing from the scope of the present disclosure.

Small cell 102 includes a transmitter/receiver circuit 202 for transmitting and receiving data to and from user devices 104 and other cells in the networked environment. Small cell 102 can include various interfaces, buffers, and other typical components for facilitating the wireless communications between small cell 102, other cells, and user devices. For example, in some embodiments small cell 102 includes a channel selector, scheduler, and other components that assist small cell 102 in receiving and transmitting signals to and from other cells and user equipment in some embodiments. The configuration of small cell 102 can vary without departing from the scope of the present disclosure.

Small cell 102 includes processing circuit 204 including a processor 206 and memory 208. Processor 206 is, or includes, one or more microprocessors, application specific integrated circuits (ASICs), circuits containing one or more processing components, a group of distributed processing components, circuitry for supporting a microprocessor, or other hardware for processing. Processor 206 executes computer code stored in memory to complete and facilitate the activities described herein. Memory 208 is any volatile or non-volatile computer-readable storage medium capable of storing data or computer code relating to the activities described herein. For example, memory 208 is shown to include modules that are computer code modules (e.g., executable code, object code, source code, script code, machine code, etc.) for execution by processor 206. According to some embodiments, processing circuit 204 can represent a collection of processing devices (e.g., servers, data centers, etc.). In such cases, processor 206 represents the collective processors of the devices and memory 208 represents the collective storage devices of the devices.

Various modules are illustrated in memory 208 for interference management of the small cells of the network (e.g., to conduct the HeMS activities as described above). An interference management (IM) enable module 210 is shown that determines whether to enable providing interference management at small cell 200. In some embodiments, IM enable module 210 determines if there is a significant neighbor cell observed. In other words, IM enable module 210 checks if one or more neighboring cells to small cell 102 interfere with the small cell. If there is no significant neighbor cell, small cell does not provide interference management, which guarantees that all bandwidth is available to user devices connected to small cell 102. IM enable module 210 is described in greater detail in FIG. 3.

A user equipment (UE) classification module 212 is shown that classifies a user device based on the impact of neighbor small cells on the device. For example, the user device is classified as a cell edge UE or a cell center UE at the small cell or HeNB in question. In some embodiments, the user equipment makes a measurement and transmits the measurement to the HeNB and UE classification module 212. UE classification module 212 then classifies the user device based on various metrics, such as the UE reference signal received quality (RSRQ), the delta reference signal received power (RSRP) of the HeNB and the strongest neighbor cell relative to the UE, and/or the wideband channel quality indication (CQI) report. In some embodiments, user devices are classified based on one of two cases: for a fixed frequency reuse pattern, and a dynamic frequency reuse pattern.

In some embodiments, small cell 102 generates a fractional frequency reuse (FFR) pattern for use in reducing interference with neighboring small cell clusters. For example, small cell 102 uses a pre-defined FFR pattern that is used to determine a frequency channel for various small cells in the network that best avoids interference. As another example, small cell 102 derives a FFR pattern based on various metrics associated with user devices in the network. Memory 208 is shown to include a FFR selection module 214 for determining the FFR pattern to use. In some embodiments, FFR selection module 214 receives several FFR patterns from a management system (e.g., HeMS). In some embodiments, each FFR pattern defines a number of cell groupings that are used to determine frequency channels for the small cells in each grouping (e.g., such that each grouping of cells utilizes a different frequency band within a downlink frequency range used by the small cells).

Memory 208 is shown to include a channel analysis module 216 for retrieving metrics related to user devices in the network. For example, channel analysis module 216 can retrieve various metrics relating to the user devices such as UE RSRQ, delta RSRP, wideband CQI report, etc. The activities of channel analysis module 216 are described in greater detail with respect to FIGS. 4A-B according to some embodiments.

Figure 3:
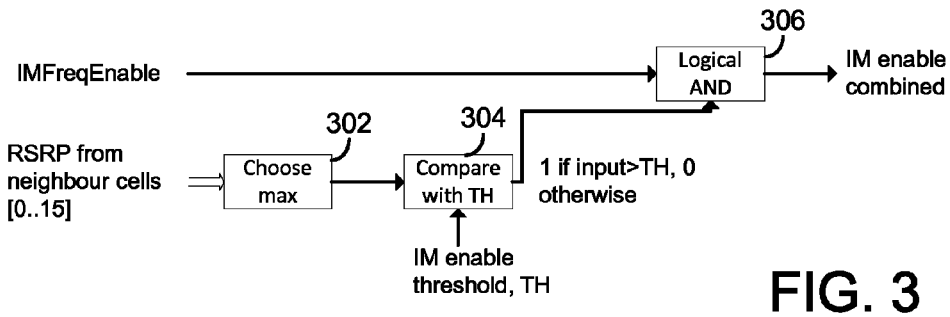
FIG. 3 illustrates enabling an interference management operation of the small cell according to an embodiment.

Referring now to FIG. 3, a block diagram is shown that illustrates the activities of IM enable module 210 in greater detail according to some embodiments. IM enable module 210 determines a reference signal received power per resource element (RSRP) from other cells in the network. IM enable module 210 selects the maximum RSRP (302) and compares the value with an IM enable threshold TH (304). IM enable module 210 enables interference management of small cell 102 if the RSRP is greater than TH (306), assuming that interference management is enabled by small cell 102 (indicated as input IMFreqEnable in FIG. 3).

Figure 4A:
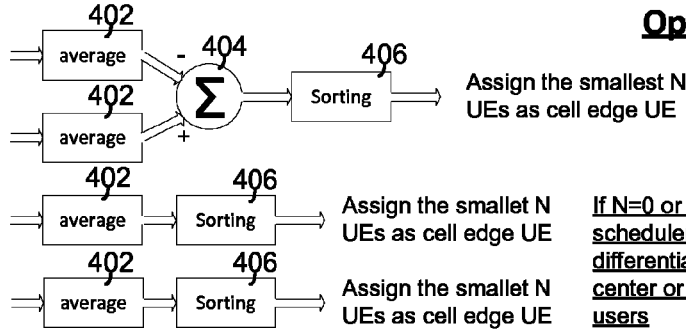
FIGS. 4A-B illustrate an operation of analyzing user device metrics and classifying user devices in a network by the small cell according to an embodiment.
Figure 4B:
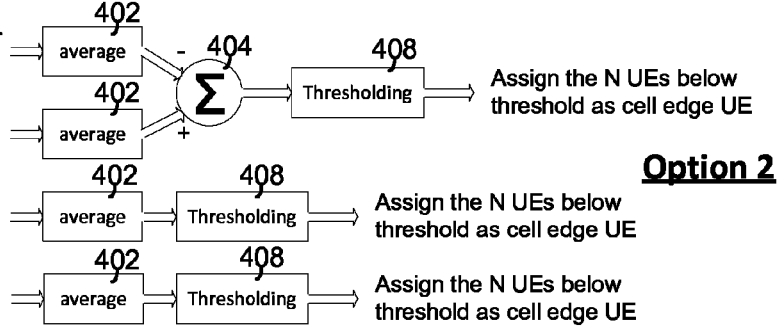

Referring now to FIGS. 4A-B, a block diagram is shown to illustrates the activities of UE classification module 212 and channel analysis module 216 in greater detail according to some embodiments. As described above, user devices are classified based on a fixed frequency reuse pattern or a dynamic frequency reuse pattern. In some embodiments, small cell 102 determines a sub-group of total active user devices in the network to be classified as a cell edge UE. For example, for M active user devices and a desired ratio k of cell edge UEs to all devices, small cell 102 determines how many user devices N to classify as cell edge UEs.

FIG. 4A illustrates the fixed frequency reuse pattern option according to some embodiments. Small cell 102 receives various metrics relating to the user devices such as UE RSRQ, delta RSRP, wideband CQI report, etc. Small cell 102 receives the metrics and averages the metrics for each user device (402). For example, small cell 102 receives metrics from each user device over a period of time and averages together the metrics. Small cell 102 then aggregates the RSRP metrics for the user devices (404).

Small cell 102 then sorts the metrics, and assigns the smallest N devices based on the metrics as cell edge UEs (406). In other words, the user devices with metrics that indicate the most possible interference from neighboring small cells are identified as cell edge UEs. For example, a user device with a low RSRQ is more likely to encounter interference between neighboring cells and is therefore more likely to be identified as a cell edge UE.

Referring now to FIG. 4B, the dynamic frequency reuse pattern option is shown. In the embodiment of FIG. 4B, instead of sorting, each metric value is compared to a threshold (408). The user devices below a threshold in one or more metrics are classified as cell edge UEs. In some embodiments, the ratio of cell edge UEs to cell center UEs is used to adjust the FFR bandwidth.

In some embodiments, interference management schemes of small cell 102 are implemented for un-coordinated small cells in a network. In other words, a small cell 102 provides interference management schemes that do not require cooperation between other small cells.

Figure 5:
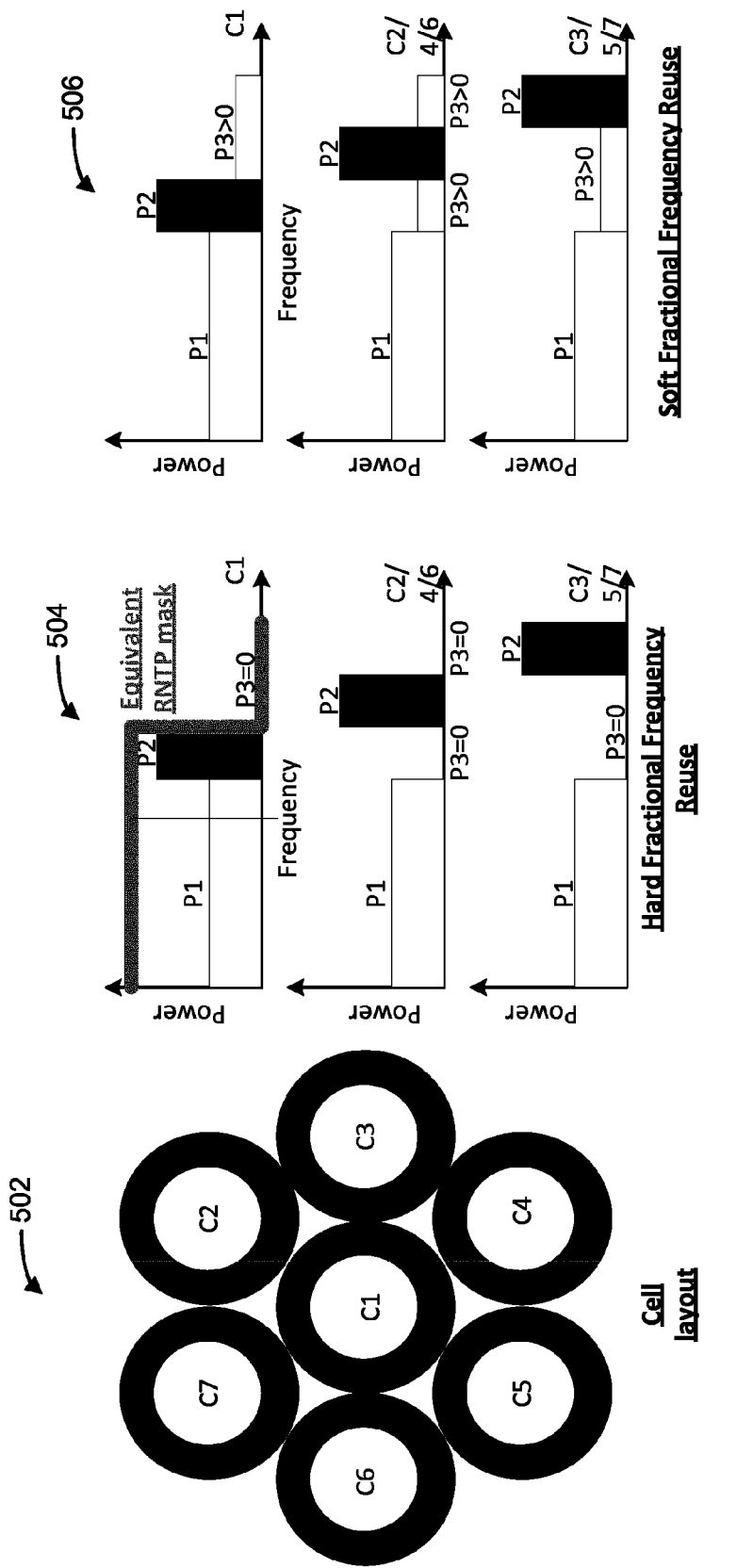
FIG. 5 is an illustrative small cell layout in a network and a hard fractional frequency reuse scheme and soft fractional frequency reuse scheme for the cell layout according to an embodiment.

In some embodiments, small cell 102 can provide either a hard fractional frequency reuse scheme or a soft fractional frequency reuse scheme. Referring also to FIG. 5, an example cell layout 502 and illustration of the hard fractional frequency reuse scheme 504 and soft fractional frequency reuse scheme 506 is shown. Frequency reuse generally refers to using the same frequencies over different geographical areas. This allows for a division of a frequency band while reducing the impact on the network capacity. For example, in some embodiments, it is better to have small cells in different geographical areas to share the same frequency, so that in total, each small cell has a greater frequency to work with. Referring to cell layout 502, C1 operates at a first frequency, C2, C4, and C6 operate at a second frequency, and C3, C5, and C7 operate at a third frequency. In the illustrated implementation, no immediately adjacent small cells utilize the same frequency band.

In the soft fractional frequency reuse scheme 506, the cell area is divided into a central region (e.g., C1) where the full frequency band is available and a cell edge area in with a smaller portion of the frequency band is available. In the hard fractional frequency reuse scheme 504, the smaller portion of the frequency is not made available in a given region. For example, referring to small cell C1, in the hard fractional frequency reuse scheme, a smaller portion of the frequency band in a cell edge area is not available like it can be in the soft fractional frequency reuse scheme.

In some embodiments, small cell 102 generates or selects a FFR pattern for neighboring small cell clusters. The FFR pattern is used to divide the frequency band in accordance with a soft fractional frequency reuse scheme or hard fractional frequency reuse scheme.

In some embodiments, the FFR pattern is generated in one of two ways. A first option is a HeMS-assisted system in which a pre-defined FFR pattern is provided to the small cell or HeNB. In some embodiments, the HeMS provides to the HeNB all the equivalent masks it has for a neighboring cell cluster. The HeNB derives a FFR pattern (e.g., frequency segments for cell center UEs and cell edge UEs from the equivalent relative narrowband transmit power (RNTP) masks as shown in FIG. 5). To assign the HeNB a specific FFR pattern, the following options are considered in some embodiments:

HeMS assigns the FFR pattern, based on TR-196 where the first RNTP mask/FFR pattern is designated for the HeNB;

the FFR pattern is linked to PCI mod 3 or mod 6; this table is defined by the HeMS and provided to the HeNB;

a UE-assisted procedure with a sub-band CQI report; in this case the HeNB checks the CQI reports from cell edge UEs on all FFR segments, and picks a FFR pattern with the FFR segment that corresponds to the sub-band with the highest average CQI across all cell edge UEs;

cell edge UE classification option 1 is used.

The HeMS-assisted system, in some embodiments, requires an interface between the HeMS and HeNB.

A second option is selecting a FFR pattern without assistance from the HeMS. The HeNB or small cell derives a FFR pattern based on the user device sub-band CQI report. In some embodiments, the HeMS has no involvement or only sets a limit on the number of sub-bands that are allocated to cell edge UEs. The limit can be a specific number or an indication of a range, in which case the HeNB can have a mapping table to a number of sub-bands for not exceeding the limit (to maintain fairness in the network).

Figure 6:
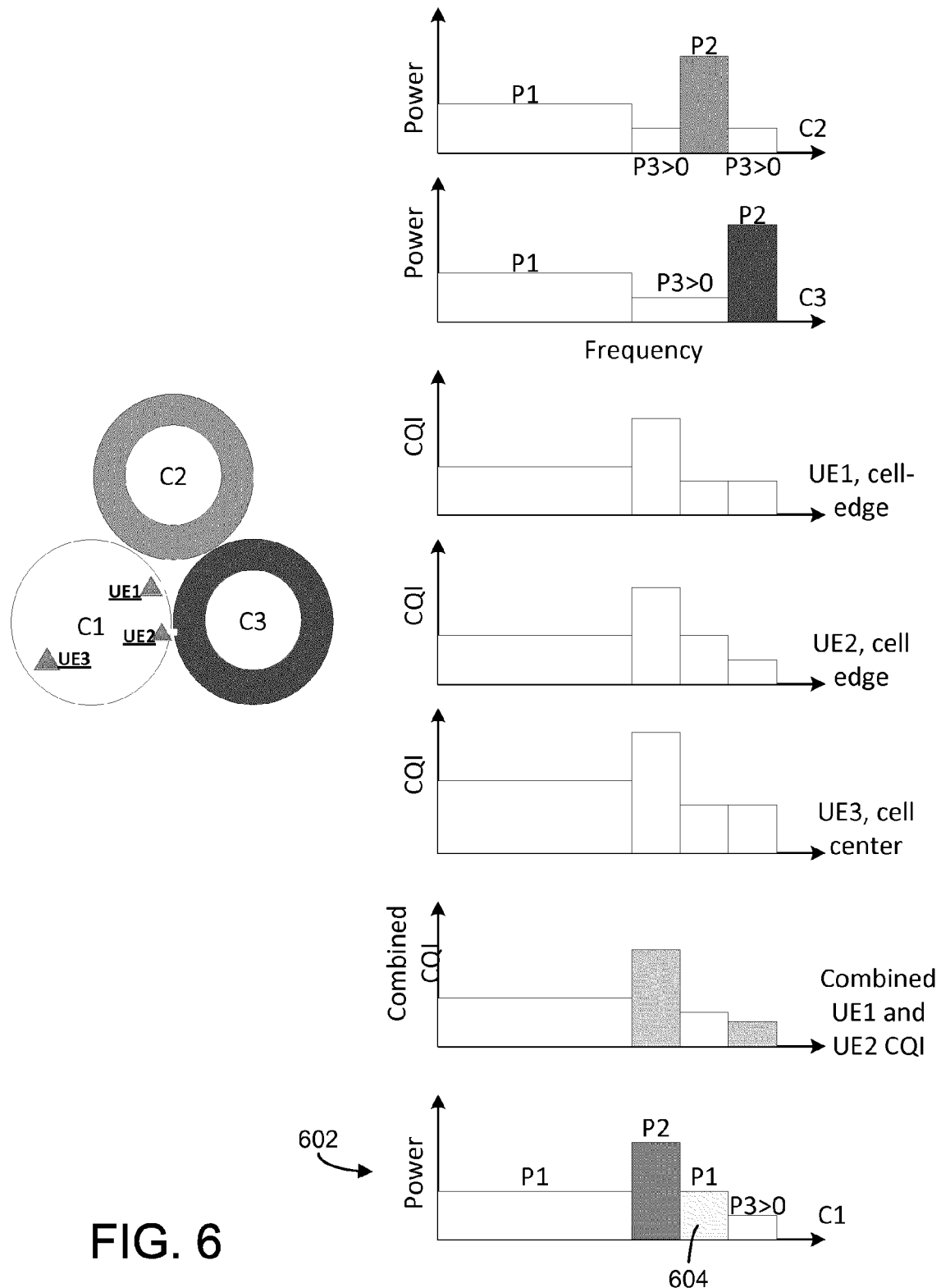
FIG. 6 illustrates deriving a fractional frequency reuse pattern based on metrics from a user device in a network at the small cell according to an embodiment.

Referring also to FIG. 6, the second option is illustrated in greater detail according to some embodiments. The small cell or HeNB collects the cell edge UE sub-band CQI report (e.g., via module 216) and does a longer time average. In some embodiments, the small cell combines the CQIs. Based on the combined CQI, the percentage of cell edge UEs (out of all active UEs in the cell), and the number of neighboring small cells, the HeNB chooses a number of sub-bands with the highest CQI (up to the limit set by the HeMS) for FFR pattern generation. The HeNB further sets a number of sub-bands with the lowest CQI (up to the limit set by the HeMS) for protection of neighbor cell edge users. In some embodiments, ambiguity can happen due to an insufficient number of cell edge UE report, limited cell edge UE locations, or bands used by neighboring cells not being protected (e.g., the second P1 sub-band 604 illustrated in graph 602.

Referring now to FIGS. 7A-B, coordinated interference management is shown, according to some embodiments. Coordinated IM refers to interference management schemes that uses an interface to neighboring small cells to exchange information on predicted or promised physical resource block (PRB) usage from the cells (e.g., an X2 interface). FIG. 7B is a table illustrating message content that are shared between the small cells via the interface according to some embodiments. FIG. 7A illustrates the RNTP bitmap generation as described below.

There are two options to generate a RNTP for the small cell, using the neighbor cell RNTP report, according to some embodiments. The first option does not utilize a user device measurement for the small cell. The RNTP is calculated based on a weighted sum of neighbor cell RNTP bitmaps from neighbor cells. In one example, i, j, J(i) represent the HeNB index, the neighbor cell index and the set of HeNB neighbor cells, respectively, and $RSRP_{i,j}$, $P_{b,j}$, $N_j$, $RNTP\_TH_j$, and $PDCCH_j$ represent the RSRP, P-b, number of cell specific antenna ports, RNTP threshold, and PDCCH interference impact, respectively, of a small cell j. In some embodiments, the weighted sum of the neighbor cell RNTP for HeNB i is given by:

$$S_i = \sum_{j \in J(i)} RNTP_{TH_j} \cdot \frac{N_j \cdot RSRP_{i,j} \cdot k(PDCCH_j)}{(1 + P_{b,j})},$$

where $k(PDCCH_j) = \left(1 + \frac{PDCCH_j}{OFDM \text{ symbols in a } TTI}\right)$ when $PDCCH_j > 0$ and $k(PDCCH_j) =$ $$\left(1 + \frac{3}{OFDM \text{ symbols in a } TTI}\right)$$

when $PDCCH_j = 0$. The HeNB or small cell chooses a number of PRBs (up to the limit set by the HeMS) with the smallest values in $S_i$. These PRBs are used for cell edge UE scheduling. The RNTP bitmap is updated and the RNTP threshold is computed. The RNTP map is sent to neighbor cells. In some embodiments, the information exchange over the interface between neighbor cells and the small cell is synchronized to happen around the same time.

A second option is implemented when UE reports are available for the HeNB, in some embodiments. The examples from the first option are extended with the following modifications. Let M, Edge(i), $RSRP_{k,i,j}$ represent the total number of cell edge UEs for the HeNB, the set of cell edge UEs, and the RSRP of the k-th cell edge UE measured on neighbor cell j, respectively. $RSRP_{i,j}$ is redefined with the following equation:

$$RSRP_{i,j} = \frac{1}{M} \cdot \sum_{k \in Edge(i)} RSRP_{k,i,j}.$$

Figure 8:
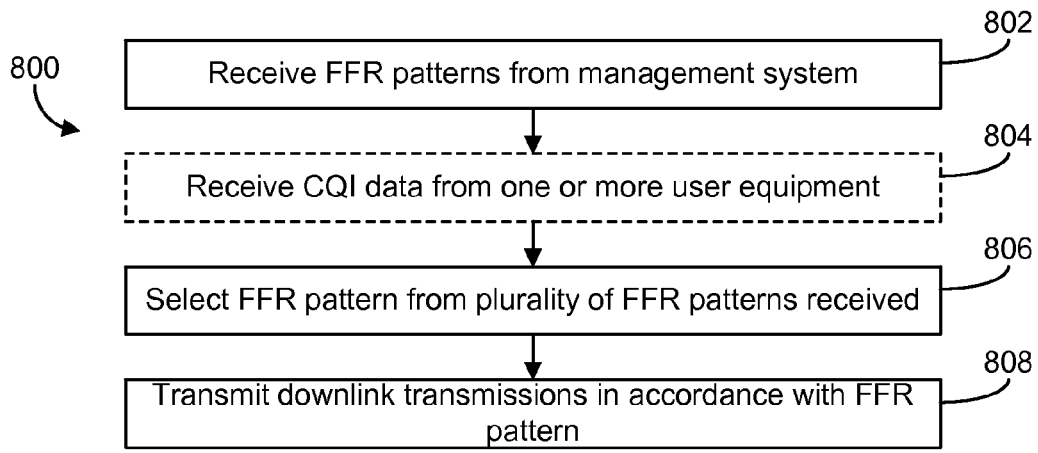
FIG. 8 illustrates a flow for transmitting in a network based on a FFR pattern according to an embodiment.

Referring now to FIG. 8, a flow 800 for transmitting in a network based on a FFR pattern is shown, according to an exemplary embodiment. Flow 800 is executed for a scenario in which the HeMS assists the small cell or HeNB in selecting a FFR pattern for use. Flow 800 is executed at a small cell or HeNB, in some embodiments.

The HeMS or other management system responsible for managing the operations of a number of small cells provides a number of FFR patterns for a frequency range (802). Each FFR pattern defines a number of cell groupings, each grouping including one or more of the small cells in the networked environment. In some embodiments, each cell grouping transmits downlink transmissions over a different one of a number of frequency bands within the frequency range. A FFR pattern is selected (806) and downlink transmissions are transmitted in accordance with the FFR pattern (808). In some embodiments, selecting the FFR pattern at 806 includes selecting a FFR pattern using a physical cell identifier associated with the small cell. The FFR pattern is chosen without using predicted resource use data from other small cells.

In some embodiments, flow 800 optionally includes receiving CQI data from one or more user equipment connected to the small cell (804). The CQI data is used to select the FFR pattern at 806. The user equipment, in some embodiments, include user equipment near an edge of the coverage of the first small cell.

Figure 9:
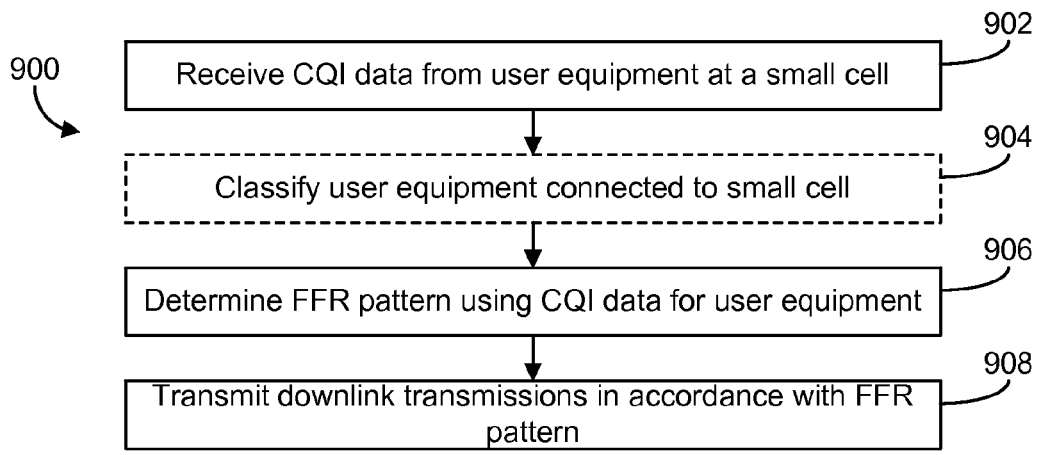
FIG. 9 illustrates a flow for transmitting in a network based on a FFR pattern according to another embodiment.

Referring now to FIG. 9, a flow 900 for transmitting in a network based on a FFR pattern is shown, according to another exemplary embodiment. Flow 900 is executed for a scenario in which the HeMS does not assist the small cell or HeNB in selecting a FFR pattern for use. Flow 900 is executed at a small cell or HeNB.

CQI data from user equipment connected to the small cell is received by the small cell (902). A FFR pattern is determined by the small cell for downlink transmissions of the small cell using the CQI data from the user equipment (906). The FFR pattern defines a frequency band for downlink transmissions of the small cell from among a number of frequency bands within a frequency range used by the neighboring small cells. Downlink transmissions are transmitted in accordance with the FFR pattern (908). The FFR pattern is chosen without using predicted resource use data from other small cells.

In some embodiments, flow 900 further includes classifying the user equipment connected to the small cell (904). For example, the user equipment is classified between cell center UE and cell edge UE. Determining the FFR pattern at 906 then includes using the CQI data of the cell edge UE.

In some embodiments, flow 900 further includes selecting one or more frequency bands having a lowest CQI for protection of user equipment connected to one or more neighboring cells of the small cells, using the combination of the CQI data of the cell edge UE.

Figure 10:
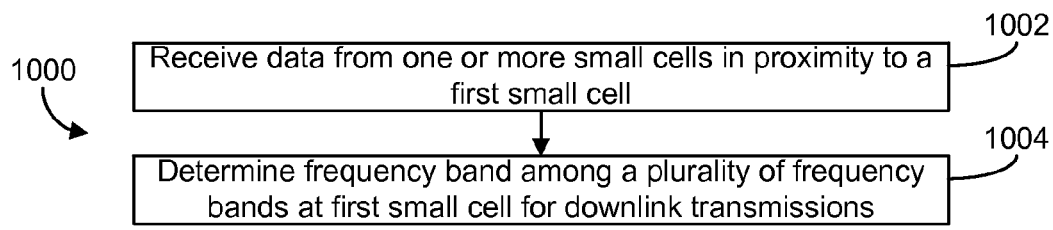
FIG. 10 illustrates a flow for determining a frequency band for downlink transmissions according to an embodiment.

Referring now to FIG. 10, a flow 1000 for determining a frequency band for downlink transmissions is shown, according to an exemplary embodiment. Flow 1000 is executed in a coordinated scenario, e.g., where the various small cells in a networked environment coordinate with one another for interference management. Flow 1000 is executed at a small cell or HeNB.

Data from one or more small cells in proximity to a first small cell is received at the first small cell (1002). The small cells transmit downlink transmissions within a frequency range. The data indicates predicted resource use information associated with the small cells. In some embodiments, the data is received by a X2 interface of the first small cell.

A frequency band is determined at the first small cell for downlink transmissions of the first small cell from among multiple frequency bands within the frequency range (1004) using the predicted resource use information associated with the other small cells.

In some embodiments, the data received includes a RNTP bitmap for each small cell. Determining the frequency band at 1004 then includes determining a RNTP bitmap for the first small cell using a combination of the RNTP bitmaps for the other small cells. In some embodiments, a weighted combination of the RNTP bitmaps is used to determine the frequency band, and RSRP measurements are not used.

In some implementations, RSRP measurements associated with user equipment connected to the first small cell are received. Determining a RNTP bitmap at 1004 then includes using the RSRP measurements along with the received RNTP bitmaps.

Referring generally to FIGS. 11A-14B, illustrative implementations of block diagrams and input and output parameters are provided corresponding to features shown in the flows of FIGS. 8-10, according to some embodiments.

Figure 11A:
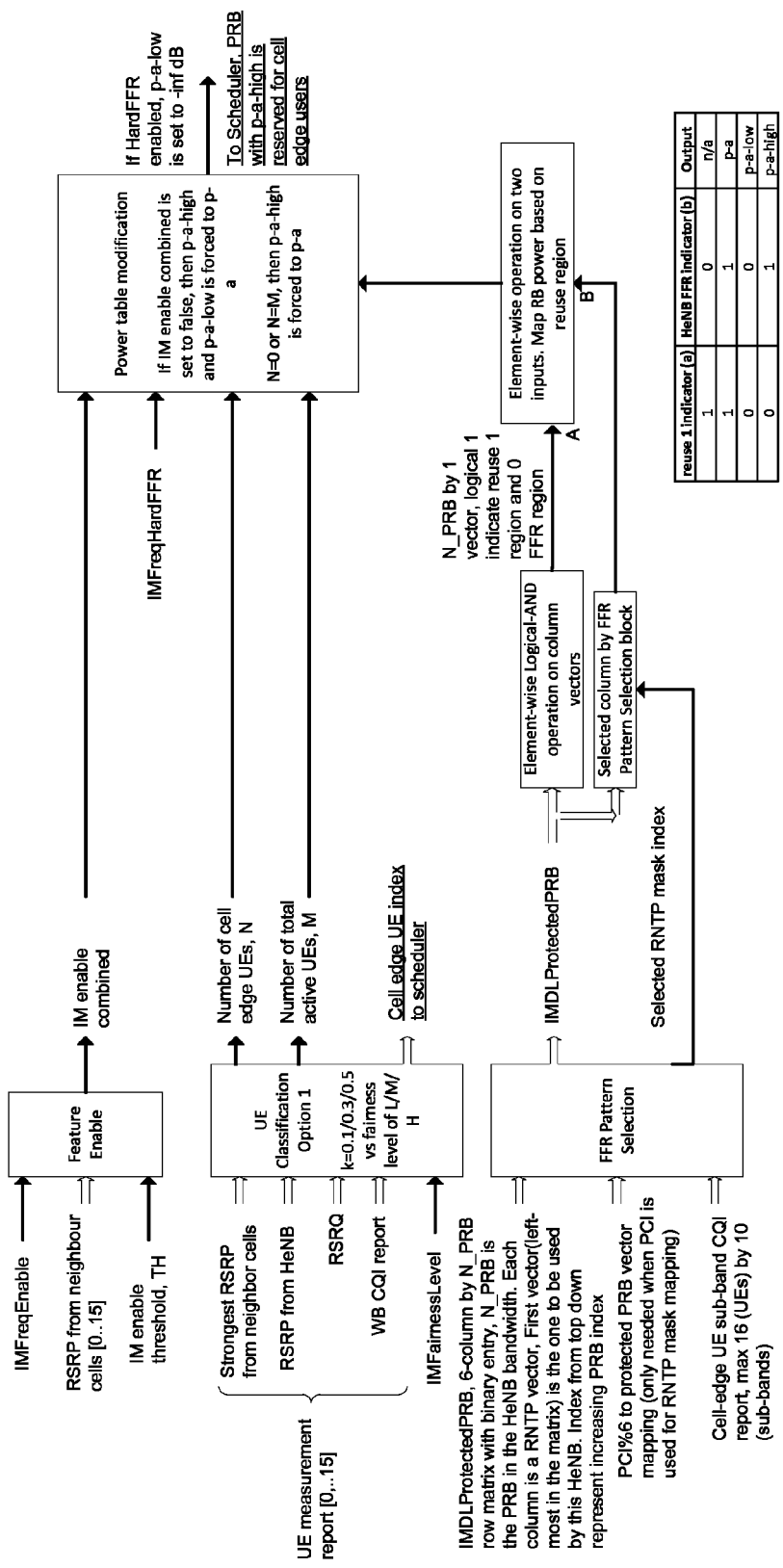

FIG. 11A is a block diagram of a system for uncoordinated interference management, according to some embodiments. The block diagram of FIG. 11A is executed to determine a fixed FFR pattern. FIGS. 11B-C are tables illustrating the input parameters and output parameters of the system, according to some embodiments. The output is provided to a scheduler of the small cell.

Figure 12A:
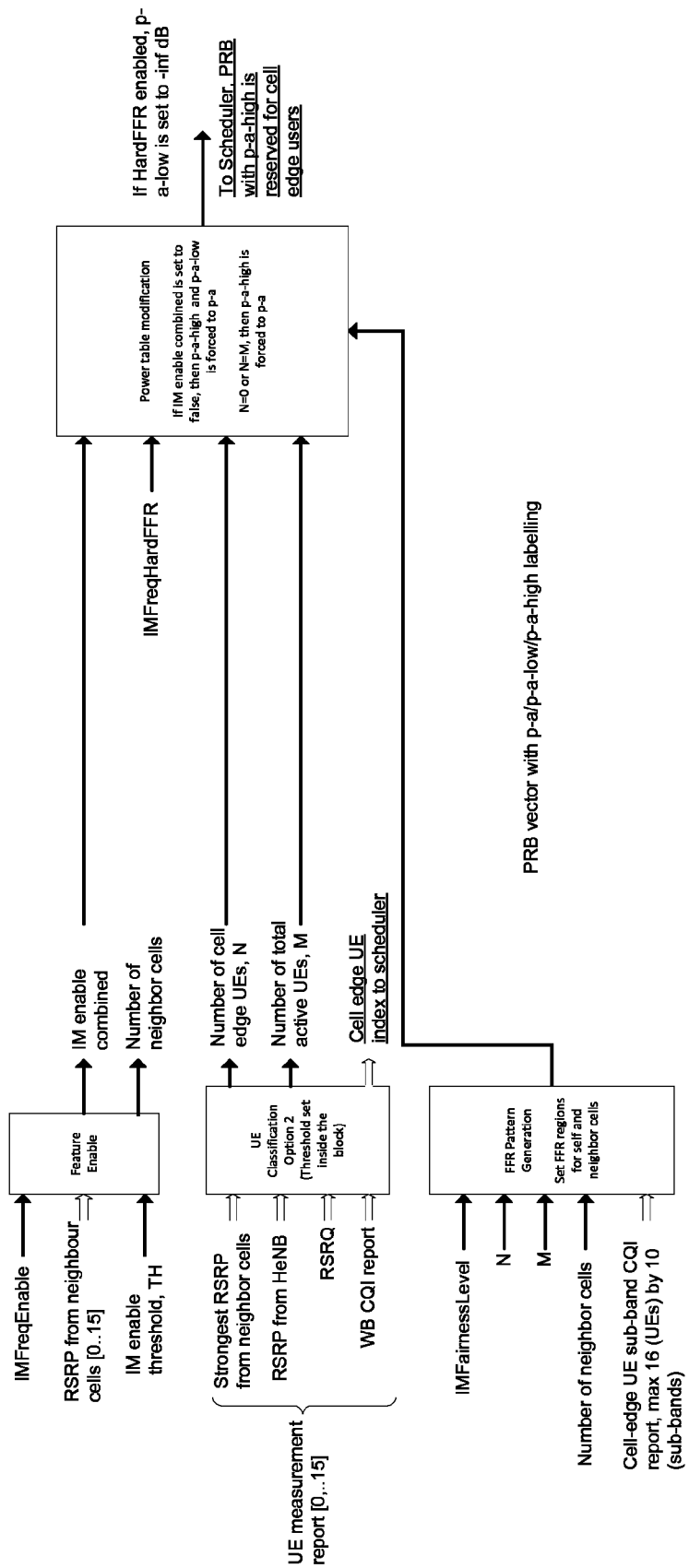

FIG. 12A is a block diagram of a system for uncoordinated interference management, according to some embodiments. The block diagram of FIG. 12A is executed to determine a dynamic FFR pattern. FIGS. 12B-C are tables illustrating the input parameters and output parameters of the system, according to some embodiments. The output is provided to a scheduler of the small cell.

Figure 13A:
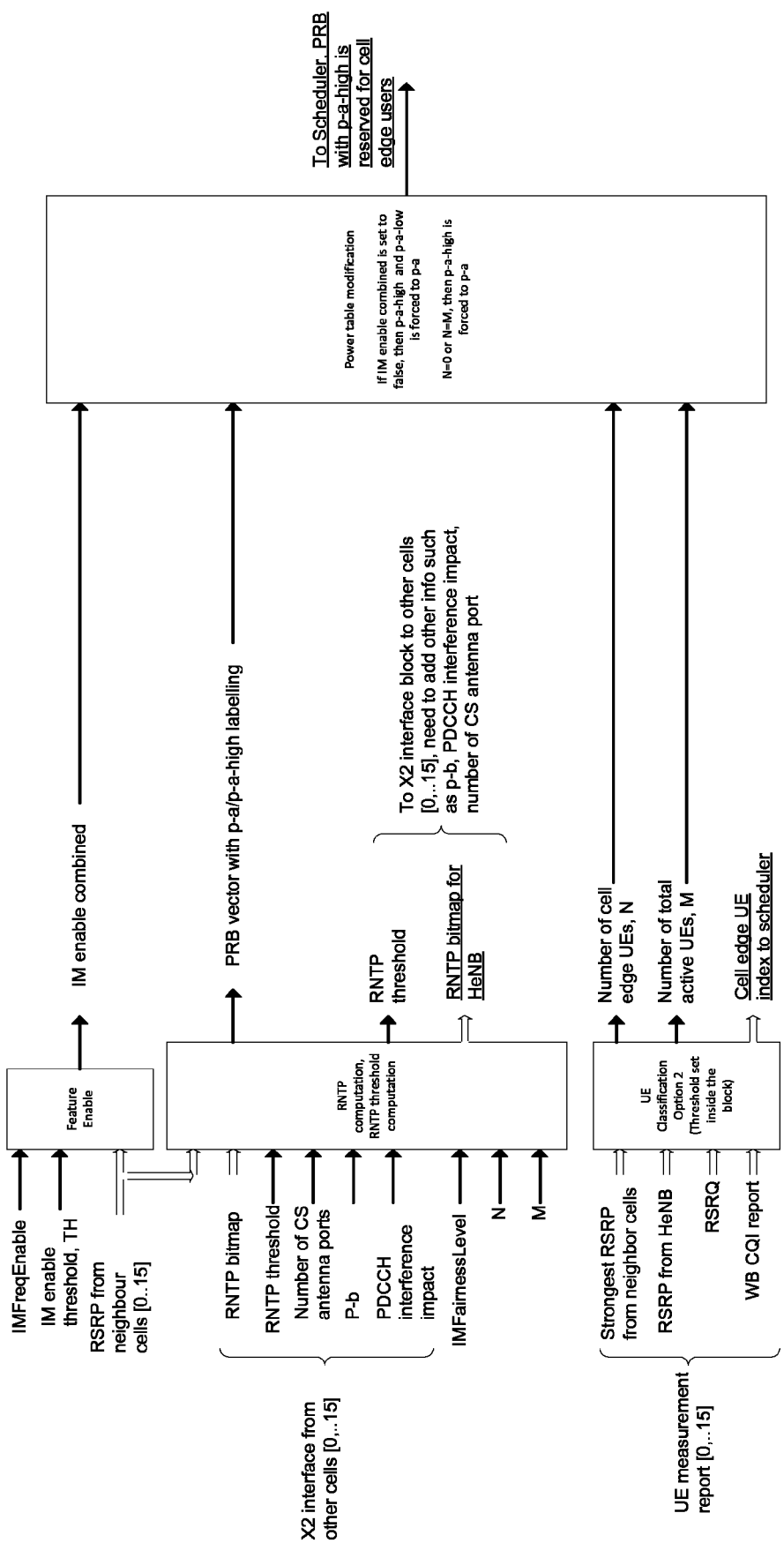

FIG. 13A is a block diagram of a system for coordinated interference management, according to some embodiments. The block diagram of FIG. 13A is executed in scenarios in which there is no user device report for RNTP calculation. FIGS. 13B-C are tables illustrating the input parameters and output parameters of the system, according to some embodiments. The output is provided to a scheduler of the small cell and to the X2 interface.

Figure 14A:
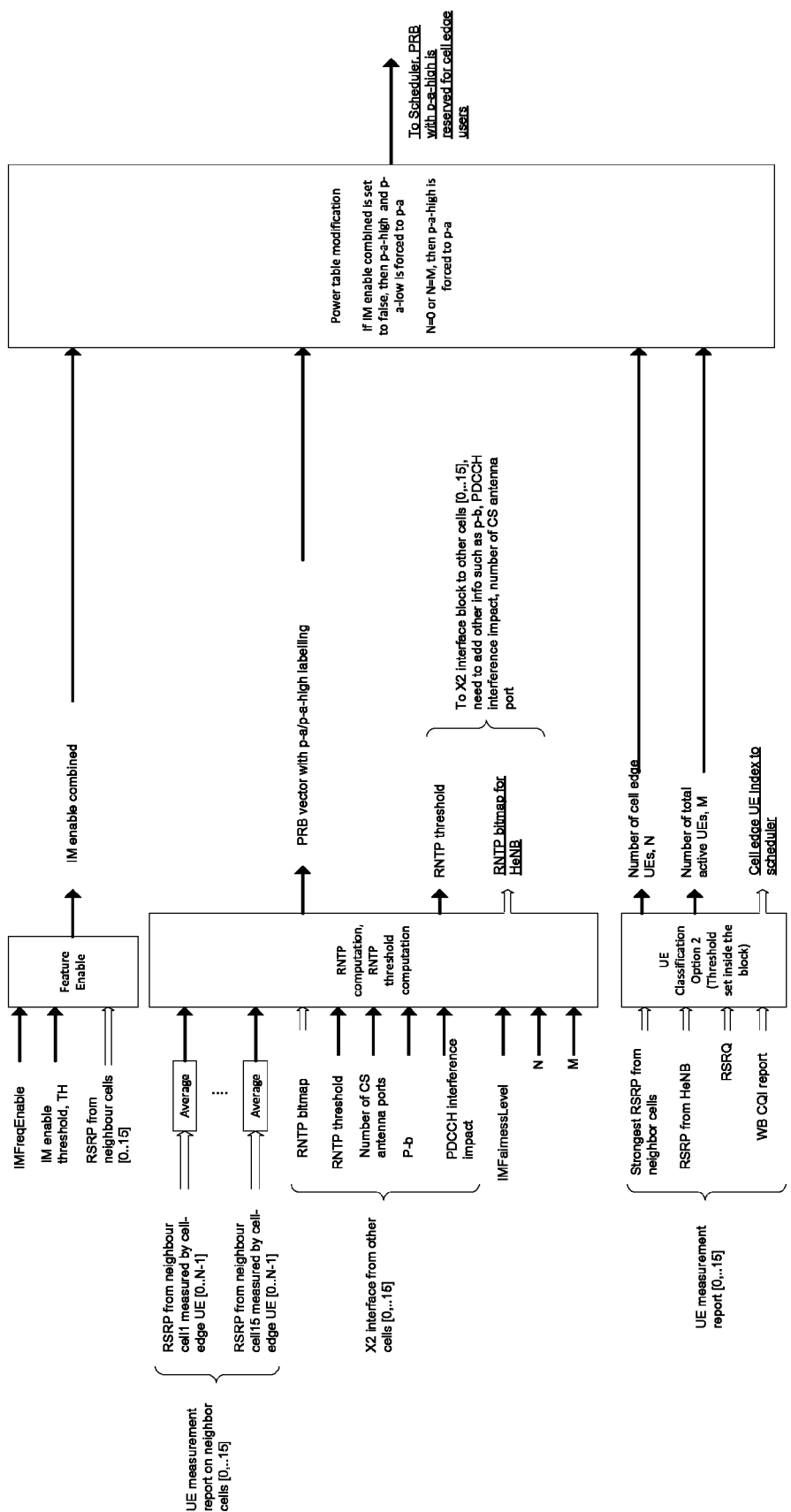

FIG. 14A is a block diagram of a system for coordinated interference management, according to some embodiments. The block diagram of FIG. 14A is executed in scenarios in which there is a user device report for RNTP calculation. FIG. 14B is a table illustrating incremental input parameters of the system, according to some embodiments.

One embodiment includes a system including circuitry configured to: receive a plurality of fractional frequency reuse (FFR) patterns for a frequency range, wherein each FFR pattern is configured to define a plurality of cell groupings, each including one or more of a plurality small cells, and wherein each of the plurality of cell groupings is configured to transmit downlink transmissions over a different one of a plurality of frequency bands within the frequency range; select a first FFR pattern from among the plurality of FFR patterns received from the management system; and transmit downlink transmissions in accordance with the first FFR pattern.

Another embodiment includes a system including circuitry configured to: receive, at a first small cell of a plurality of small cells within a proximity, channel quality indication (CQI) data from a plurality of user equipment connected to the first small cell; determine a fractional frequency reuse (FFR) pattern for downlink transmissions of the first small cell using the CQI data from the user equipment, the FFR pattern defining a first frequency band for downlink transmissions of the first small cell from among a plurality of frequency bands within a frequency range used by the plurality of small cells; and transmit downlink transmissions in accordance with the FFR pattern.

Another embodiment includes a system including circuitry configured to: receive, at a first small cell, data from one or more second small cells in proximity to the first small cell, wherein the first small cell and the one or more second small cells are configured to transmit downlink transmissions within a frequency range, and wherein the data indicates predicted resource use information associated with the second small cells; and determining, by the first small cell, a first frequency band for downlink transmissions of the first small cell from among a plurality of frequency bands within the frequency range using the predicated resource use information associated with the second small cells.

Embodiments of the disclosure are described in the general context of method steps or operations which can be implemented in one embodiment by a program product including machine-executable instructions, such as program code, for example, in the form of program modules executed by machines in networked environments.

It should be noted that although the flowcharts provided herein show a specific order of method steps or operations, it is understood that the order of these steps or operations may differ from what is depicted. Also two or more steps or operations can be performed concurrently or with partial concurrence. Such variation will depend on the software and hardware systems chosen and on designer choice. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or can be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method comprising:
receiving, from a management system configured to manage one or more operations of a plurality of small cells, a plurality of fractional frequency reuse (FFR) patterns for a frequency range, wherein each FFR pattern is configured to define a plurality of cell groupings, each including one or more of the plurality of small cells, and wherein each of the plurality of cell groupings is configured to transmit downlink transmissions over a different one of a plurality of frequency bands within the frequency range;
receiving, by a first small cell of the plurality of small cells, channel quality indication (CQI) data from one or more user equipment connected to the first small cell;
classifying the one or more user equipment connected to the first small cell as cell center user equipment and cell edge user equipment;
selecting a first FFR pattern from among the plurality of FFR patterns received from the management system using the CQI data from the cell edge user equipment; and
transmitting downlink transmissions in accordance with the first FFR pattern.

2. The method of claim 1, wherein selecting the first FFR pattern comprises selecting, by a first small cell of the plurality of small cells, the FFR pattern using a physical cell identifier associated with the first small cell.

3. The method of claim 1, wherein the one or more of the plurality of small cells of each cell grouping are not adjacent to each other.

4. The method of claim 1, wherein the one or more user equipment comprise one or more cell edge user equipment near an edge of coverage of the first small cell.

5. The method of claim 4, further comprising classifying at least one of the one or more user equipment as the cell edge user equipment using one or more metrics received from each of the one or more user equipment.

6. The method of claim 5, wherein the one or more metrics comprise a reference signal received quality signal associated with each of the one or more user equipment.

7. The method of claim 1, wherein selecting the first FFR pattern comprises selecting, by a first small cell of the plurality of small cells, the first FFR pattern without using predicted resource use data from other small cells of the plurality of small cells.

8. A method comprising:
receiving, by a first small cell of a plurality of small cells within a proximity, channel quality indication (CQI) data from a plurality of user equipment connected to the first small cell;
determining, by the first small cell, a fractional frequency reuse (FFR) pattern for downlink transmissions of the first small cell using the CQI data from the user equipment, the FFR pattern defining a first frequency band for downlink transmissions of the first small cell from among a plurality of frequency bands within a frequency range used by the plurality of small cells;
transmitting downlink transmissions in accordance with the FFR pattern; and
classifying the plurality of user equipment connected to the first small cell as cell center user equipment and cell edge user equipment, wherein determining the FFR pattern using the CQI data comprises determining the FFR pattern using the CQI data of the cell edge user equipment.

9. The method of claim 8, further comprising:
determining a ratio of the cell edge user equipment to cell center user equipment; and
adjusting the FFR pattern using the ratio.

10. A method comprising:
receiving, by a first small cell of a plurality of small cells within a proximity, channel quality indication (CQI) data from a plurality of user equipment connected to the first small cell;
determining, by the first small cell, a fractional frequency reuse (FFR) pattern for downlink transmissions of the first small cell using the CQI data from the user equipment, the FFR pattern defining a first frequency band for downlink transmissions of the first small cell from among a plurality of frequency bands within a frequency range used by the plurality of small cells;
transmitting downlink transmissions in accordance with the FFR pattern; and
classifying the plurality of user equipment as cell center user equipment and cell edge user equipment using one or more metrics received from each of the plurality of user equipment.

11. The method of claim 10, wherein the one or more metrics comprise a reference signal received quality signal associated with each of the plurality of user equipment.

12. A method comprising:
receiving, by a first small cell of a plurality of small cells within a proximity, channel quality indication (CQI) data from a plurality of user equipment connected to the first small cell;
determining, by the first small cell, a fractional frequency reuse (FFR) pattern for downlink transmissions of the first small cell using the CQI data from the user equipment, the FFR pattern defining a first frequency band for downlink transmissions of the first small cell from among a plurality of frequency bands within a frequency range used by the plurality of small cells;
transmitting downlink transmissions in accordance with the FFR pattern;
classifying the plurality of user equipment connected to the first small cell as cell center user equipment and cell edge user equipment, wherein determining the FFR pattern using the CQI data comprises selecting a frequency band with a highest CQI as the first frequency band using a combination of the CQI data of the cell edge user equipment.

13. A method comprising:
receiving, by a first small cell of a plurality of small cells within a proximity, channel quality indication (CQI) data from a plurality of user equipment connected to the first small cell;
determining, by the first small cell, a fractional frequency reuse (FFR) pattern for downlink transmissions of the first small cell using the CQI data from the user equipment, the FFR pattern defining a first frequency band for downlink transmissions of the first small cell from among a plurality of frequency bands within a frequency range used by the plurality of small cells;
transmitting downlink transmissions in accordance with the FFR pattern;
classifying the plurality of user equipment connected to the first small cell as cell center user equipment and cell edge user equipment, wherein determining the FFR pattern using the CQI data comprises selecting one or more frequency bands having a lowest CQI for protection of user equipment connected to one or more neighboring cells of the plurality of small cells using the combination of the CQI data of the cell edge user equipment.

14. The method of claim 8, wherein determining the FFR pattern comprises determining the FFR pattern without using predicted resource use data from other small cells of the plurality of small cells.

15. A method comprising:
receiving, by a first small cell, data from one or more second small cells in proximity to the first small cell, wherein the first small cell and the one or more second small cells are configured to transmit downlink transmissions within a frequency range, and wherein the data indicates predicted resource use information associated with the second small cells; and
determining, by the first small cell, a first frequency band for downlink transmissions of the first small cell from among a plurality of frequency bands within the frequency range using the predicated resource use information associated with the second small cells.

16. The method of claim 15, wherein receiving the data from the one or more second small cells comprises receiving a relative narrowband transmit power (RNTP) bitmap for each of the second small cells, and wherein determining the first frequency band using the predicted resource use information comprises determining a RNTP bitmap for the first small cell using a combination of the RNTP bitmaps for the second small cells.

17. The method of claim 16, wherein determining the first frequency band comprises determining the first frequency band using a weighted combination of the RNTP bitmaps for the second small cells without using reference signal received power (RSRP) measurements associated with user equipment connected to the first small cell.

18. The method of claim 16, further comprising determining whether to determine the RNTP bitmap for the first mall cell using reference signal received power (RSRP) measurements associated with user equipment connected to the first small cell based at least in part on the availability of reports from the user equipment at the first small cell.

19. The method of claim 16, further comprising receiving reference signal received power (RSRP) measurements associated with user equipment connected to the first small cell, wherein determining the RNTP bitmap for the first small cell comprises determining the RNTP bitmap for the first small cell using the RNTP bitmaps for the second small cells and the RSRP measurements associated with the user equipment.

20. The method of claim 15, wherein receiving the data from the second small cells comprises receiving the data via an X2 interface of the first small cell.

* * * * *